(12) United States Patent
Remon et al.

(10) Patent No.: US 6,585,557 B1
(45) Date of Patent: Jul. 1, 2003

(54) BEESWAX MIMETIC SUBSTANCES AND METHODS OF OPERATING BEEHIVES

(75) Inventors: Jean Paul Remon, Melle (BE); Franciscus Joanna Jacobs, Scheldewindeke (BE)

(73) Assignee: Universiteit Gent, Ghent (BE)

( * ) Notice: Subject to any disclaimer, the term of this patent is extended or adjusted under 35 U.S.C. 154(b) by 0 days.

(21) Appl. No.: 09/868,672

(22) PCT Filed: Dec. 21, 1999

(86) PCT No.: PCT/EP99/10249

§ 371 (c)(1),
(2), (4) Date: Aug. 9, 2001

(87) PCT Pub. No.: WO00/08508

PCT Pub. Date: Jul. 6, 2000

(30) Foreign Application Priority Data

Dec. 23, 1998 (EP) .............................................. 98204445

(51) Int. Cl.$^7$ .......................... A01K 51/00; A01K 47/02
(52) U.S. Cl. ............................................. 449/1; 449/44
(58) Field of Search ................................ 449/1, 42, 44

(56) References Cited

U.S. PATENT DOCUMENTS

| | | | |
|---|---|---|---|
| 1,282,645 A | 10/1918 | Sechrist | |
| 1,583,605 A | 5/1926 | Root | |
| 1,672,853 A | 6/1928 | Settle | |
| 3,052,622 A | 9/1962 | Johnson | |
| 3,864,196 A | 2/1975 | Schmidt | |
| 4,267,613 A * | 5/1981 | Hester | 449/42 |
| 4,608,151 A | 8/1986 | Miller | |
| 4,663,791 A * | 5/1987 | Nishi | 449/44 |
| 4,992,073 A | 2/1991 | Levy | 449/44 |
| 6,358,340 B2 * | 3/2002 | Ferrer Vidal | 449/42 |

FOREIGN PATENT DOCUMENTS

| | | |
|---|---|---|
| BE | 1035428 | 8/1953 |
| FR | 1035428 | 8/1958 |

OTHER PUBLICATIONS

Johaneson, "Substitutes for Beeswax In Comb and Comb Foundation", BRA Research News, No. 5, pp 146–156.

* cited by examiner

Primary Examiner—Charles T. Jordan
Assistant Examiner—Elizabeth Shaw
(74) Attorney, Agent, or Firm—Barnes & Thornburg

(57) ABSTRACT

A beeswax mimetic substance is described which comprises or consists essentially of a synthetic or semisynthetic wax, in particular a microcrystalline wax. The wax preferably has a relatively narrow range of mean carbon chain length. An apiculture accessory using the wax and a method of operating beehives using the wax to reduce disease and pests in beehives is described.

21 Claims, 8 Drawing Sheets

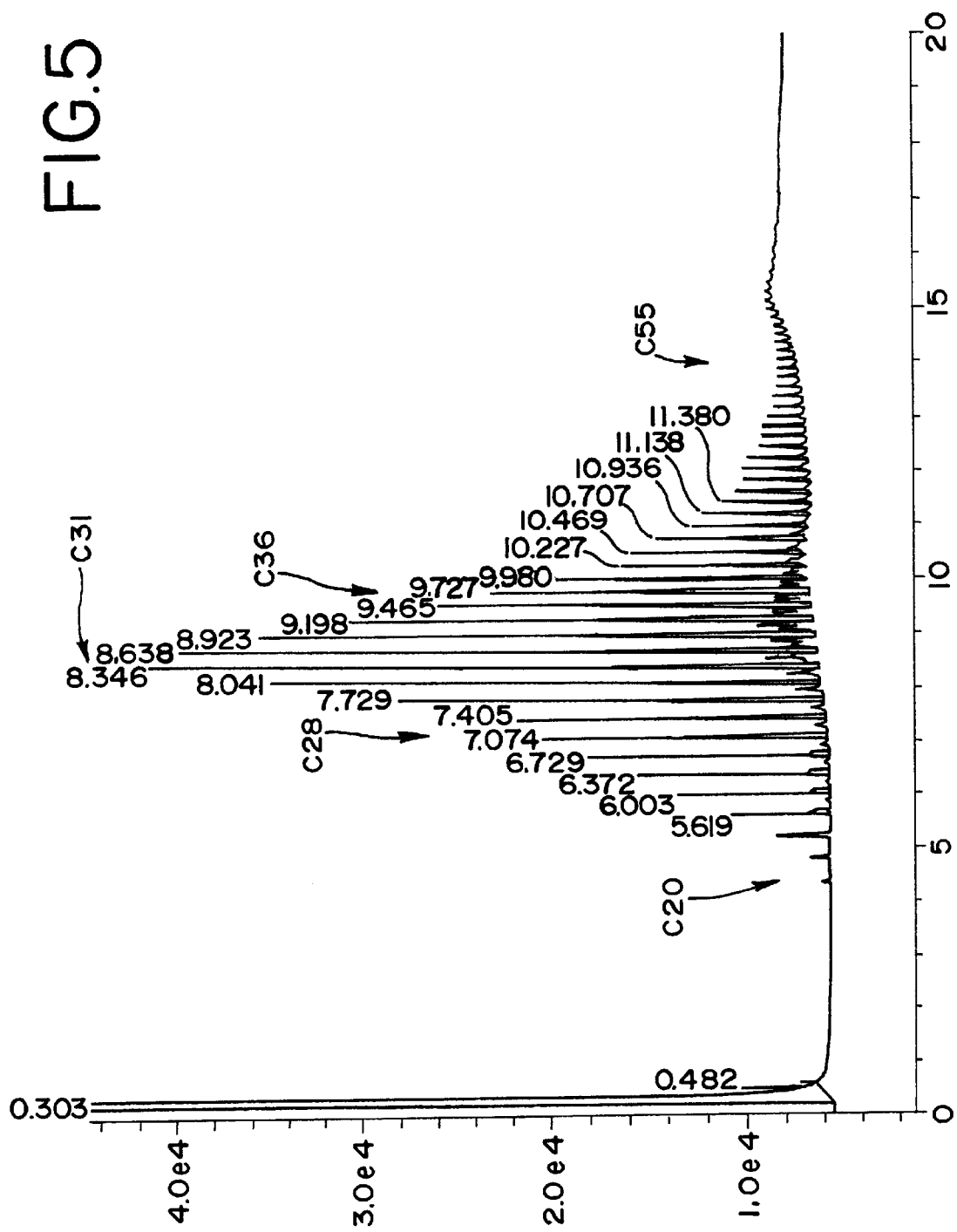

BEESWAX MIMETIC SUBSTANCES AND METHODS OF OPERATING BEEHIVES

The present invention relates to apiculture components such as honeycomb foundations, artificial honeycombs, beehive covers, beehive bottom boards, beehive queen excluders, beehive queen cages, beehive cell cups and any other elements and surfaces which are used in a beehive and which are accessible to the bees. The present invention also relates to a method of operating a beehive.

TECHNICAL BACKGROUND

Bees, like all other living things, are subject to disease, pests and parasites. In the commercial production of honey it is necessary to maintain the health of the bee colonies in order to maintain production and also to provide honey of high quality. In relation to the treatment of bee diseases, nowadays fat soluble substances are used, resulting in an increased accumulation of residues in industrially sold beeswax. As the beekeepers are gathering and using the melted wax again and again, from one year to the next, the problem is aggravating every season. Furthermore, pathogens can be spread by using bee wax coming from abroad which has been demonstrated for Paenibacillus larvae, causing American Foulbrood disease in honeybee colonies.

Bee colonies which are infested by the mite Varroa Jacobsoni are inevitably killed unless the beekeeper takes measures against them. One method of control is by spraying, dusting or fumigating with acaricides in the beehive and an effectiveness of 80 to 90% has been reported. In order to increase the effectiveness even further, DE-A-341 7674 suggests the introduction of the acaricide into the wax foundation which will be drawn by the bees into a final honeycomb. One problem with this technique is that is common to reuse bees wax from one year to the next and therefore that the levels of chemicals such as insecticides, fungicides and antibiotics in tho wax may increase with time. There is the danger that chemicals used to ward off insects may find their way into the honey and into the human food chain as well as into beeswax candles. Further, the prolonged exposure of insects, bacteria and fungi to insecticides, fungicides and antibiotics has the effect of selecting and favouring those insects, bacteria and fungi which become resistant by mutation. It is now well understood that the increasing prophylactic use of insecticides, fungicides and antibiotics is accompanied by an increasing resistance to these chemicals so that the pharmaceutical industry is perpetually in a neck-on-neck race with the developing resistance. This has resulted in very conservative treatment strategies when powerful insecticides, fungicides or antibiotics are involved, However, when such chemicals arc used only when there is definite evidence of infection or infestation, there is always the possibility that there is not a 100% eradication of the pest or disease. This means that these pests and diseases may be carried forward to the next years bee colonies. There has been a need for a solution to this problem with beeswax for some time.

The success of a bee colony argues for cohesion of individuals in social activity: as few as 50 bees will form a cluster, with or without a queen, and the same number is sufficient for comb construction. The cluster provides a mechanism for the regulation of the nest temperature and much of the colony's behaviour is mediated through a large series of chemical and tactile interactions. The combs are the result of stimuli acting on the bees and also provide direct stimuli to the bees themselves. The beeswax is first elaborated (mandibulated) and modified to form a comb wax of reasonable stiffness, strength and flexibility. The working properties of the wax and its end-use are finely tuned to the thermal conditions of the nest. One problem in commercially operated beehives is the mechanical stability of man-made beeswax foundations which are drawn into the final honeycombs by the bees. When the beehive temperature approaches the melting point of beeswax (about 62° C.) the mechanical properties of the beeswax reduce which can result in sagging or collapse of the honeycomb. Various attempts have been made to use a more stabile core to the foundations such as paper, aluminium or plastic onto which a thin layer of beeswax is applied. For instance, the beeswax may be applied to a wire mesh, a glass fibre mat (DE-A-4011168) or a fibre board (U.S. Pat. No. 1,672,853). One reason why artificial honeycomb foundations are provided is that energy generated from the available food can be diverted into honey production rather than into beeswax production. Hence, the bees honey production is increased. Despite these attempts to use artificial and natural materials in beehives, foundations still usually consist of a thin plate of beeswax which is mounted on a wooden frame and supported by metal wires. On both sides punched or moulded hexagonal depressions serve as starting points for the formation of honeycomb cells drawn out by the bees. One disadvantage with introducing hard materials into the core of foundations is that the bees often reposition the wax both on one foundation as well as between foundations. This means that when sufficient bees wax has been removed by the bees the underlying hard material is exposed and strips of beeswax may come free.

Attempts have been made to use plastic materials for foundations. For instance, U.S. Pat. No. 1,282,645 describes the use of baekelite as a foundation. However, it is not clear from the historical records whether combs were ever successfully drawn on the backelite material. As far as it is known, a beeswax coating was used over the baekelite but the odour of carbolic acid was not masked completely by the wax and when the bees gnawed through the wax they were repelled. FR-A-1035428 discloses the use of microcrystalline waxes in a foundation but the composition is not recorded as showing mimetic properties. More recently, in U.S. Pat. No. 4,992,073, the use of a mixture of 7.5 to 15% weight of beeswax and a polypropylene copolymer has been proposed. Due to the fact that beeswax is included in this mixture, this is not a completely synthetic foundation and the reuse of contaminated beeswax cannot be eliminated by this known procedure. A similar problem occurs with the beeswax mixture proposed in U.S. Pat. No. 1,582,605 in which a foundation is proposed made from blended vegetable wax and beeswax whereby the outer layer is preferably beeswax. A suitable vegetable wax is considered to be carnauba wax and a satisfactory mixture is said to be 30% carnauba wax and 70% pure bees wax Despite the many proposals for synthetic or partially synthetic foundations, a completely satisfactory result has not been obtained and foundation manufacture is nowadays still very similar to that of one hundred years ago. The foundations may tot be too thick or too hard or the bees will not accept them. However, thin foundations must be structurally sound and able to carry the load of the fully drawn comb full of honey at temperatures experienced inside a beehive, e.g. 35–37° C. Any materials used must also be of relatively low price to remain economically viable. Additional thermal and mechanical loadings may be placed upon the foundation during honey extraction and post-extraction sterilising processes which are usually carried out at such a high temperature that they melt and remove any beeswax which bas been applied to the underlying structure. This means that any inner foundation support (e.g. wire) has to be recoated with beeswax which increases the costs of the final foundation. Last but not least, the bees must also accept the material used in the foundation.

One further aspect of life in a bee-hive influences the choice of suitable materials. It is believed that communication within the hive is carried out by chemical substances which form a "chemical language". Pheromones are one group of such chemicals which are sometimes called "social chemicals". Within the beehive these chemicals may be transmitted by contact, i.e. they may be rubbed off the bees onto beeswax and other bees and transported around the hive. Any material within a beehive must support this language. Any foreign materials must not block, mask or modify any of these chemical messengers otherwise important commands within the language my be distorted or eliminated.

In the literature reference can often be found to so-called "beeswax substitutes". These materials are used in chemical formulations such as cosmetic or pharmaceutical products as a replacement for natural beeswax, These beeswax substitutes have nothing to do with materials used in beehives as described in the present invention nor in apiculture in general. Webster's New International Dictionary defines the word "mimetic" as "characterised by or exhibiting biological mimicry".

Waxes derived from petroleum am well known and include hydrocarbons of three types: paraffin, semi-microcrystalline, and microcrystalline. The quality and quantity of the wax separated from the crude oil depend on the source of the crude oil and the degree of refining to which it has been subjected prior to wax separation. Paraffin, semi-microcrystalline, and microcrystalline waxes may be differentiated using the refractive index of the wax and its congealing point as determined by ASTM D 938 or DIN ISO 2207. In addition, petroleum waxes can be distinguished by their viscosities. For example, semi-microcrystalline wax has a kinetic viscosity at 98.9° C. of less than 10 mm$^2$/s (=cSt), while microcrystalline wax has a kinetic viscosity at 98.9° C. of greater than or equal to 10 mm$^2$/s (=cSt).

Microcrystalline wax usually contains substantial portions of hydrocarbons other than normal alkanes. It is usually obtained from the highest boiling fraction of a crude oil. Microcrystalline waxes display both chemical and physical properties quite different from paraffin wax At similar melting points, the microcrystallines have a much higher molecular weight than the paraffins. Microcrystalline waxes have a very delicate crystalline structure, the crystals of which may be of a fine needle or short plate type.

In the manufacture of conventional microcrystalline waxes, the bottoms stream from a vacuum tower or "bright stock" is deasphalted to produce a heavy deasphalted oil which is then extracted to partially remove aromatics. Hydrocarbonaceous feeds from which underwaxed bright stocks may be obtained usually contain aromatic compounds as well as normal and branched paraffins of very long chain lengths. These feeds usually boil in the gas oil range. Typical feedstocks are vacuum gas oils with normal boiling ranges above about 350° C. and below about 600° C., and deasphalted residual oils having normal boiling ranges above about 480° C. and below about 650° C. Reduced topped crude oils, shale oils, liquefied coal, coal, coke distillates, flask or thermally cracked oils, atmospheric residua, and other heavy oils can also be used as the feed source. Other sources may be the mineral ozocerite or lignite.

Typically, the hydrocarbonaceous feed is distilled at atmospheric pressure to produce a reduced crude (residuum) which is then vacuum distilled to produce a distillate fraction and a residue fraction. The vacuum residuum fraction may then be hydrocracked using standard reaction conditions and catalysts in one or more reaction zones. In general, refineries process at least one distillate fraction and one residuum fraction to produce several base stocks. Typically, several distillate factions and the residuum of a vacuum distillation operation are refined. These fractions have acquired various names in the refining art. In particular, the residuum fraction is commonly referred to as "bright stock".

The term "microcrystalline wax" generally refers to deoiled (to less than about 5 wt % oil) wax having a melting point varying from about 140° F. to 180° F. which is recovered from this deasphalted, extracted oil by dewaxing and deoiling. The wax obtained by such a process is characterised by a poor odour, a dark colour and it contains aromatic impurities as shown by ultraviolet absorption tests. Thus, the wax must be further refined in order to yield useful products. For example, microcrystalline wax may be contacted with solid absorbent materials such as bauxite or clay to absorb the aromatic compounds therefrom which impart unfavourable properties to the wax.

Various improvements in the refining of microcrystalline waxes have been made over the years. The most notable of these processes have been directed towards catalytic refining of the wax in the presence of hydrogen, also known as hydrofining. For example, U.S. Pat. No. 3,052,622 discloses taking a crude oil residua and simultaneously deasphalting and extracting the aromatics from it via the Duo-Sol process to obtain a waxy petroleum residue which is then hydrofined by passing the wax, in the presence of hydrogen, over a catalyst of nickel oxide on bauxite. The hydrofined product is then dewaxed via a conventional solvent dewaxing process using toluene and MEK as the dewaxing solvent.

To produce a refined wax that meets U.S. Food and Drug Administration (FDA) standards, the produced waxes may be further refined by contacting with a solid absorbent and then acid treated to achieve the necessary FDA colour, odour, and colour stability requirements. For instance, a process for producing high quality, high molecular weight microcrystalline wax from hydrocracked underwaxed bright stock is known from U.S. Pat. No. 4,608,151. The process comprises three steps. In the first step, a hydrocracked underwaxed bright stock is hydrodenitrified using, for example, a sulphided nickel-tin or nickel-molybdenum hydrotreating catalyst having a siliceous or alumina matrix. In the second step, the bright stock, having a reduced catalyst poison content, is hydrofinished using, for example, an unsulphided nickel-tin or palladium hydrotreating catalyst having a siliceous or alumina matrix. In the third step, the waxy oil is solvent dewaxed using a conventional dewaxing solvent such as a mixture of methyl-ethyl-ketone (MEK) and toluene. It has been found that this three-step process produces a high quality, high molecular weight microcrystalline wax.

It is an object of the present invention to provide accessories for beehives such as honeycomb foundations, artificial honeycombs, beehive covers beehive bottom boars, beehive queen excluders, beehive queen cages and beehive cell cups, which reduce the risk of transfer of diseases and pests from one year to the next.

Further, it is an object of the present invention to provide beehive accessories such as honeycomb foundations, artificial honeycombs, beehive covers, beehive bottom boards, beehive queen excluders, beehive queen cages, beehive cell cups which do not contain natural beeswax an which are lower in cost than previously known beehive accessories.

It is a further object of the present invention to provide beehive accessories such as honeycomb foundations, artificial honeycombs, beehive covers, beehive bottom boards, beehive queen excluders, beehive queen cages, beehive cell cups which are acceptable to the bees and are adequate for the thermal and mechanical loads on the beehive accessories during operation of the beehive colony as well as during ancillary processes such as honey extraction.

SUMMARY OF THE INVENTION

The present invention includes the use of a synthetic or semi-synthetic beeswax mimetic substance in an apiculture accessory, the mimetic substance being of a type which bees mandibulate interchangeably with beeswax.

The present invention may provide an apiculture accessory for use in a beehive, the accessory comprising a beeswax mimetic substance, the mimetic substance being of a type which bees mandibulate interchangeably with beeswax. The bees wax mimetic substance may be synthetic or semisynthetic and may comprise or consist essentially of a microcrystalline wax.

The present invention may also provide an apiculture accessory wherein a virgin surface of the accessory exposed to the bees comprises a semi-synthetic or synthetic mimetic substance, in particular a microcrystalline wax.

The present invention includes the method of reducing pests, disease or parasites in a beehive including at least one apiculture accessory comprising beeswax or a beeswax mimetic substance, the method comprising the step of: replacing the one apiculture accessory from time to time with the same accessory made from virgin beeswax mimetic substance, the mimetic substance being of a type which bees mandibulate interchangeably with beeswax. Preferably, the apiculture accessories in accordance with the present invention are replaced with virgin ones after any bee disease or infestation and/or after a certain period, e.g. at yearly intervals.

Any apiculture accessory in accordance with the present invention may include, for instance, any kind of suitable reinforcement, e.g. a wire frame or mesh, about which the beeswax mimetic substance is placed, for example by moulding. The beeswax mimetic substance may be applied, for instance, to any kind of sheet of material useful in a beehive such as wire mesh, plastic, paper, fibre or cardboard sheet. The apiculture accessories in accordance with the present invention may be, for example, artificial honeycombs, honeycomb foundations, beehive covers, beehive bottom boards, beehive queen excluders, beehive queen cages or beehive cell cups.

Mimetic substances in accordance with the present invention may comprise or consist essentially of microcrystalline waxes which are preferably pure white waxes. Mimetic substances in accordance with the present invention may comprise or consist essentially of unbranched (normal-) or branched (iso-) hydrocarbons or mixtures of the two. The mimetic substances in accordance with the present invention may also include saturated and do not necessarily exclude unsaturated hydrocarbons, however, the preferred manufacturing method will remove substantially all unsaturated hydrocarbons. These could be added separately, however, at a later stage. A beeswax mimetic substance in accordance with the present invention may be a homologous series of hydrocarbons. A preferred mimetic substance in accordance with the present invention is a microcrystalline wax which preferably has an ozokcrite structure. The majority of the molecules (greater 98%) of a microcrystalline wax in accordance with the present invention suitable for mid-European climates and for the bee *apis mellifora carnica* preferably have an equivalent hydrocarbon molecular chain length range as determined by high temperature capillary gas chromatography of 20 to 55. The most common equivalent chain lengths preferably lie in a range 28 to 36. The median equivalent chain length is preferably 31±4, more preferably 31±2. The mean equivalent chain length is preferably 33±4, more preferably 33±3, and most preferably 33±2. These values are specifically useful for beehives used in mid-European climates. The present invention includes modifications to these values, either up or down, to accommodate different ambient temperature conditions, e.g. as may be experienced in the tropics or in countries closer to the poles, or as may be required to match the beeswax of other varieties of bees. The distribution of equivalent hydrocarbon chain lengths in the preferred microcrystalline wax in accordance with the present invention for mid-European climates as determined by high temperature capillary gas chromatography may be represented approximately by a Poisson distribution or a combination of Poisson distributions but the present invention includes distributions anywhere between Gaussian and triangular. The mean equivalent hydrocarbon chain length is preferably between C30 and C38, or more preferably with between C30.5 and C36.5 in which the standard deviation of the distribution is between 3.5 and 6.5 carbon atoms.

A food-grade material in accordance with the present invention is a material suitable for inclusion in food for human consumption, e.g. as specified in the Food Chemical Codex, National Academy Press, 1996 or by the U.S. Food and Drug Administration. It is preferred if the microcrystalline wax used as the beeswax mimic is a refined microcrystalline wax which meets the cleanliness and purity requirements necessary for use in foods.

The dependent claims define individual embodiments of the present invention. The present invention will now be described with reference to the following drawings.

BRIEF DESCRIPTION OF THE DRAWINGS

FIG. 5 shows a sample trace from a gas chromatographic of a beeswax mimetic substance in accordance with an embodiment of the present invention.

DESCRIPTION OF THE PREFERRED EMBODIMENTS

The present invention will be described with reference to certain embodiments and drawings but the present invention is not limited thereto but only by the claims.

The present invention relates to a material which is accepted by bees as a replacement or substitute for, or an imitation of beeswax. In order to distinguish over so-called beeswax substitutes which are used in chemical, pharmaceutical and cosmetic formulations and which are remote from the applications in accordance with the present invention, a material which is mandibulated and worked by bees indistinguishably from and exchangeably with beeswax and which supports the bees' chemical language will be called a "beeswax mimetic substance" or a "beeswax mimic". The term "mimetic" as used in this invention means that the bees work with the substance as if it were beeswax and, when both materials are present in the beehive, for example as part of a foundation, the bees make no significant difference between the two. This means that a beeswax mimetic substance is used interchangeably by the bees, a damaged portion of a piece of mimetic waxy material or beeswax being repaired, for instance, by either some of the mimetic waxy material or some beeswax or a mixture of the two. In effect the bees experience (see, feel or any other sensory function) the beeswax mimetic substance as if it were beeswax as far as this subjective characteristic of the mimetic substance can be determined by objective observation of the behaviour of the bees. Mimetic substances in accordance with any embodiment of the present invention may be described as behavioural beeswax mimetic substances.

Further, to function as a successful beeswax mimetic material it should be mixable with, and have the consistency of, natural beeswax. Hence, a material as described in U.S. Pat. No. 4,992,073 is not a beeswax mimetic substance in accordance with the present invention as the polymer/beeswax mixture is a hard, intractable material. Due to the fact that the bees use their mandibles to work the wax and that these organs are very sensitive, bees appear to be able to detect fine grades of wax hardness in dependence upon temperature, crystal size and "feel" of any wax. In addition it is believed that bees secrete chemicals which they use to work and mould the natural beeswax. Hence any beeswax mimetic substance should preferably behave similarly with respect to these secretions. The present inventors do not know of any previous successful synthetic beeswax mimetic materials although a large number of synthetic materials have been tried in beehives in the past.

Figure 1:
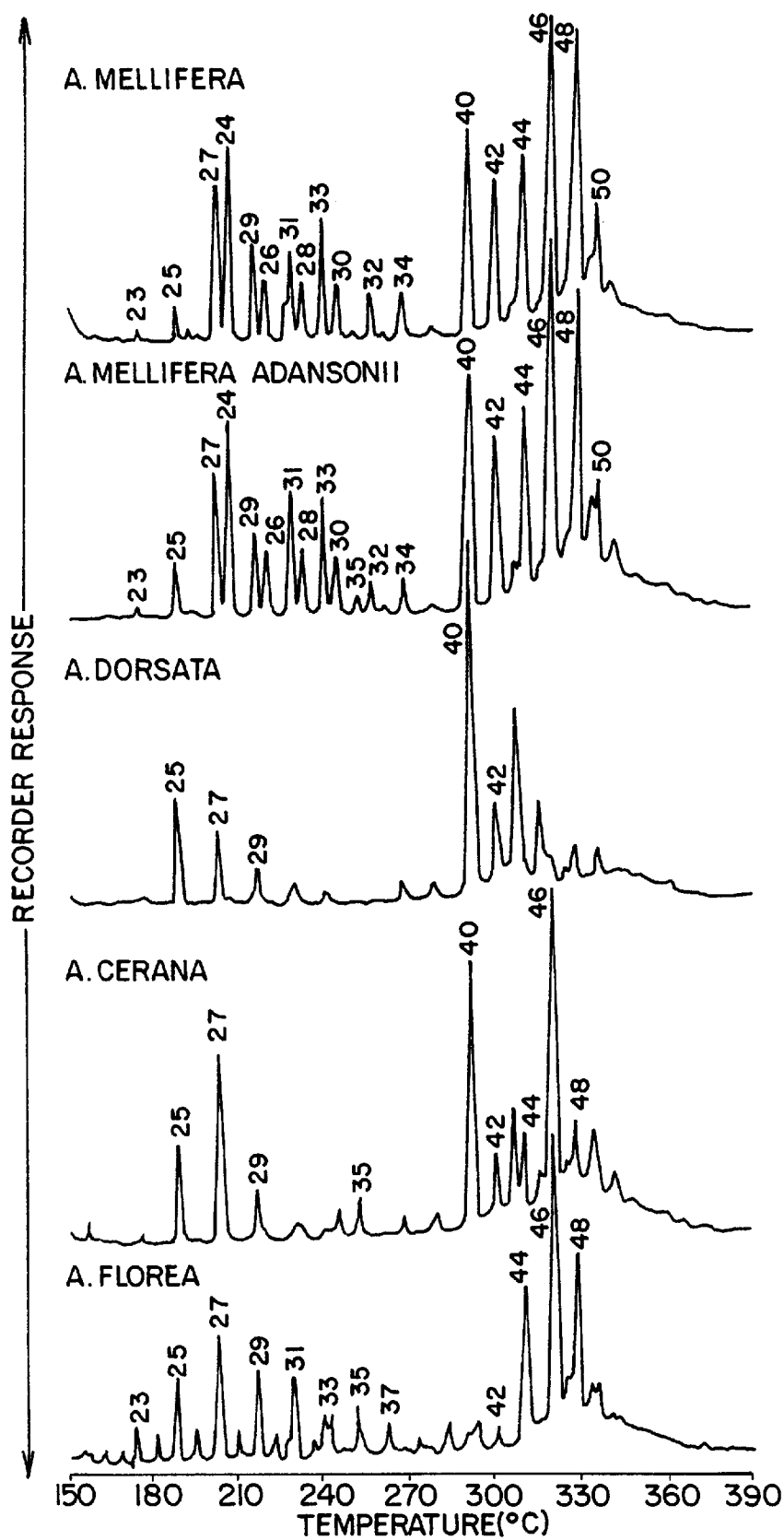
FIG. 1 is an analysis of beeswax produced by different bees.

Beeswax from various bees has been examined by gas-liquid chromatography FIG. 1 (Tulloch 1980). Variations in the chain lengths of the major components can be seen. Further, there are differences between beeswaxes from different types of bees. One bee type, *A. mellifera* has been analysed chemically in detail—see Table 1.

TABLE 1

Chemical analysis of beeswax (Tulloch 1980)

| Constituent fractions | % | Number of components in fractions | |
|---|---|---|---|
| | | Major | Minor |
| Hydrocarbons | 14 | 10 | 66 |
| Monoesters | 35 | 10 | 10 |
| Diesters | 14 | 6 | 24 |
| Triesters | 3 | 5 | 20 |
| Hydroxy monoesters | 4 | 6 | 20 |
| Hydroxy polyesters | 8 | 5 | 20 |
| Acid esters | 1 | 7 | 20 |
| Acid polyesters | 2 | 5 | 20 |
| Free acids | 12 | 8 | 10 |
| Free alcohols | 1 | 5 | ? |
| Unidentified | 6 | 7 | ? |
| TOTAL | 100 | 74 | 210 |

Table 2 gives further information with respect to the major components of this beeswax as determined by the same author.

TABLE 2

Major components of beeswax

| Component | Chain length and % |
|---|---|
| saturated hydrocarbons | C27 (4%), C29 (2%), C31 (1%) |
| saturated hydrocarbons | C31:1 (1%), C33:1 (2.5%) |
| saturated monoesters | C40 (6%), C42 (3%), C44 (3%), C46 (8%), C48 (6%) |
| unsaturated monoesters | C46:1 (2%), C48:1 (2%) |
| diesters | C56 (2%), C58 (2%), C60 (2%), C62 (3%), C64 (1%) |
| hydroxy esters | C46 (1%) |
| fatty acids | C24 (6%), C26 (1%), C28 (1%) |

What is noticeable about table 1 is that beeswax is a complex natural substance including over 280 individual components. The largest group includes various types of esters. From tables 1 and 2 there is no clear picture as how a beeswax mimetic substance could be produced other than by a commercially unrealistic attempt at complete synthesis.

The present invention is based on the very surprising realisation that it is possible to produce a waxy material relatively economically which has the mechanical and thermal properties which allow foundations to be made therefrom, which the bees readily draw into satisfactory honeycombs, while providing, a honeycomb having sufficient strength so that there is no sagging. It is anticipated that once the skilled person appreciates the elements of the present invention, that other waxy materials may be found which exhibit the required thermo-mechanical and (bio-) chemical properties. In accordance with the present invention the problem of pest and disease transfer from one year to another may be avoided by remaking and replacing at least some of the apiculture components of the beehive at regular time intervals, e.g. each year, from a hygienic, low priced, food-grade beeswax mimetic substance. This is a major advance as it avoids the traditional dependence on natural beeswax and therefore breaks the chain of disease and pest transfer from one year to the next, from one hive to another or from one country to another. In particular the availability of a low price beeswax mimic allows the redesign of traditional beehives so that structures which may harbour diseases and pests are removed each year and replaced with pristine components.

The terms "synthetic" or "semi-synthetic" as used in the present invention include waxes derived from natural sources, e.g. crude oils, which have gone through an extensive industrial process of refinement so that the final product can no longer be described as "natural". The synthetic or semi-synthetic materials described with reference to the present invention are therefore different from natural beeswax conventionally used in making apiculture accessories. Such beeswax may be "refined" or purified to remove debris before use but the final material is still substantially the same as the natural starting material.

A beeswax mimetic substance in accordance with an embodiment of the present invention at least suitable for use in mid-European climates and for the *apis mellifora carnica* bee includes a refined microcrystalline wax preferably having the properties in Table 3. A preferred microcrystalline wax at least for mid-European climates and for the bee *apis mellifora carnica* is commercially available under the trade name Apicera ™ and is available from Paramelt, Heerhugowaard, Holland. It is assumed that the same material may find advantageous use as a beeswax mimetic substance at least in temperate zones throughout the world.

When microcrystalline waxes having all the desired properties are not available, it is included within the scope of the present invention to use mixtures of microcrystalline waxes. By modifying the relative proportions of two or more microcrystalline waxes it is possible to prepare a wax having the optimum combination of properties.

TABLE 3

| Test | mean value | design tolerance ± | remarks/ test method |
|---|---|---|---|
| congealing point | 70° C. | 2° C. | ASTM D 938 |
| penetration | 16 | 2 | ASTM D 1321 |
| melting point | 75 ° C. | 3 ° C. | ASTM D 3945 |
| refractive index | 1.433 | 0.002 | |
| equivalent hydrocarbon chain length | C33 | 4, more preferably 3, most preferably 2 carbon atoms | determined by high temperature capillary gas chromatography |
| dynamic viscosity at 98.9° C. | 6.5 mPa · s | 1 | DIN 52007-2 |

Several different batches of Apicera™ were used to prepare wire supported foundations in accordance with conventional methods, e.g. moulding. No difficulty was experienced in moulding foundations using equipment usually used for moulding foundations using beeswax. It is not anticipated that there is any limitation on the present invention with respect to the design of the foundations Any conventional design may be used, hence the present invention is not limited to wired foundations. Also, the present invention is not limited to foundations. The beeswax mimetic substances of the present invention may be used to form half-cell or full-cell combs. However, due to the cost and extra difficulty of producing such fragile structures they are not preferred.

The wired foundations made using Apicera™ wax were introduced into beehives in frames. Either all the frames were made with the synthetic wax or some were introduced alongside foundations made with beeswax. The bees populating the hives were *apis mellifora carnica*. In all cases the synthetic foundations were drawn out to normal, healthy, functioning honeycombs with hexagonal cells. Larval development, pollen storage and production of honey was studied over a two year period. No difference could be found between the honeycombs drawn from natural beeswax and those from the synthetic mimic. Further, all other aspects were completely normal and the honey was of identical quality. No evidence could be found that the bees' chemical language was disturbed in any way, in any stage of the formation of a hive, e.g. during queening, raising of the brood, etc. It was also noticed that the bees used the synthetic mimetic substance or the beeswax indiscriminately indicating that the synthetic material really acted as a mimic, i.e. the bees could sense no difference. Further, honey was extracted by normal and all the honeycombs behaved in the same way indicating that the combs drawn from the synthetic mimetic substance were of equal strength. The honey extracted was examined by high temperature capillary gas chromatography to determine if any of the synthetic wax was removed by the honey extraction process. No indications of hydrocarbons from the wax could be detected in the extracted honey. Despite this it is preferred if the synthetic wax used for the foundations is food grade quality so that if any wax does get accidentally Included in the honey, there is no loss of quality of the honey.

One major advantage of the microcrystalline beeswax mimetic substance in accordance with the above embodiment of the present invention has been found to be that it has a low microbiological loading in its normal form. Hence, foundation produced with the wax using normal manufacturing conditions does not introduce known bee pathogens into a hive. This is in contrast to natural beeswax, e.g. that obtained from abroad to supplement indigenous supplies of beeswax.

Figure 2:
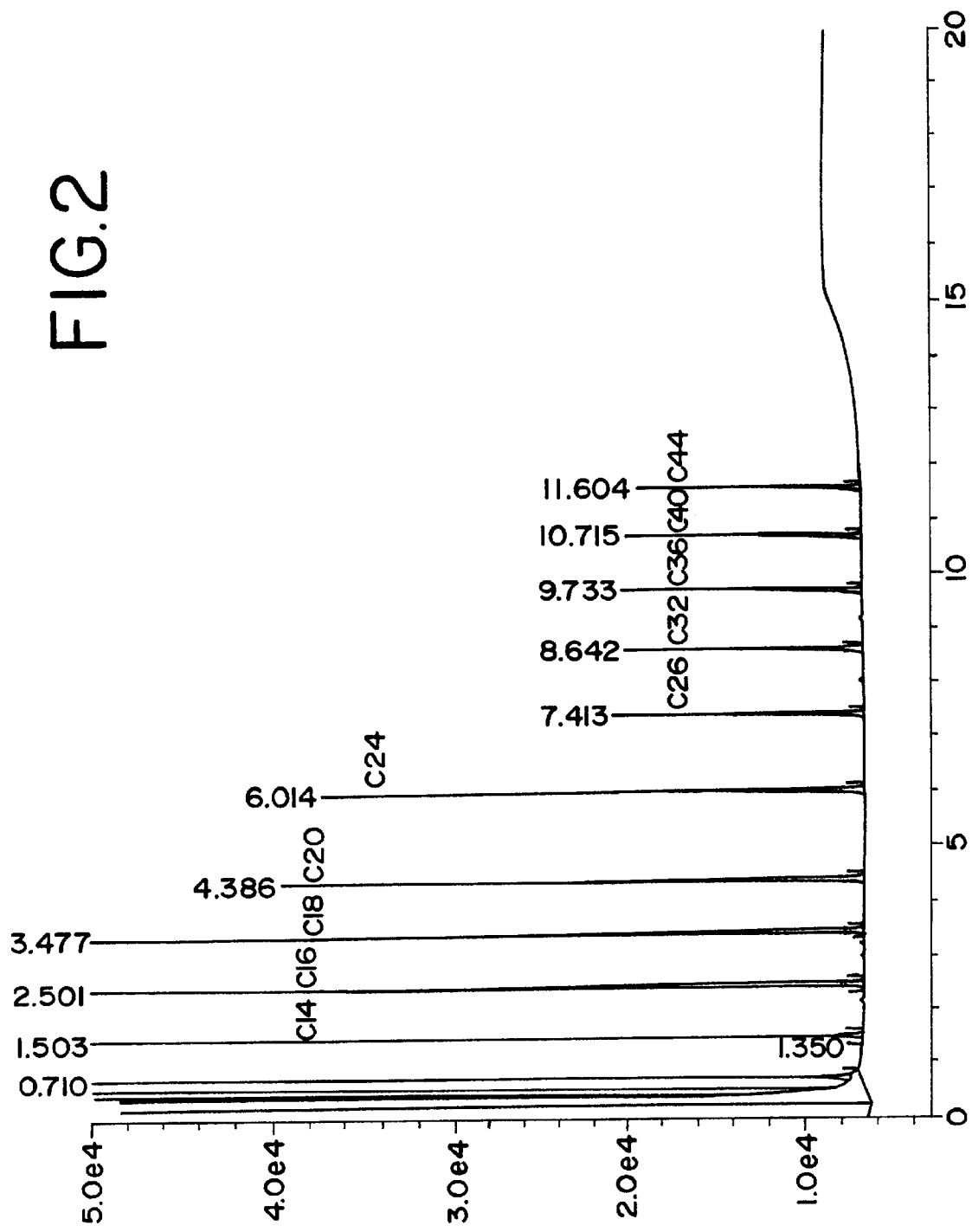
FIG. 2 shows the results of gas chromatography for test materials.
Figure 3:
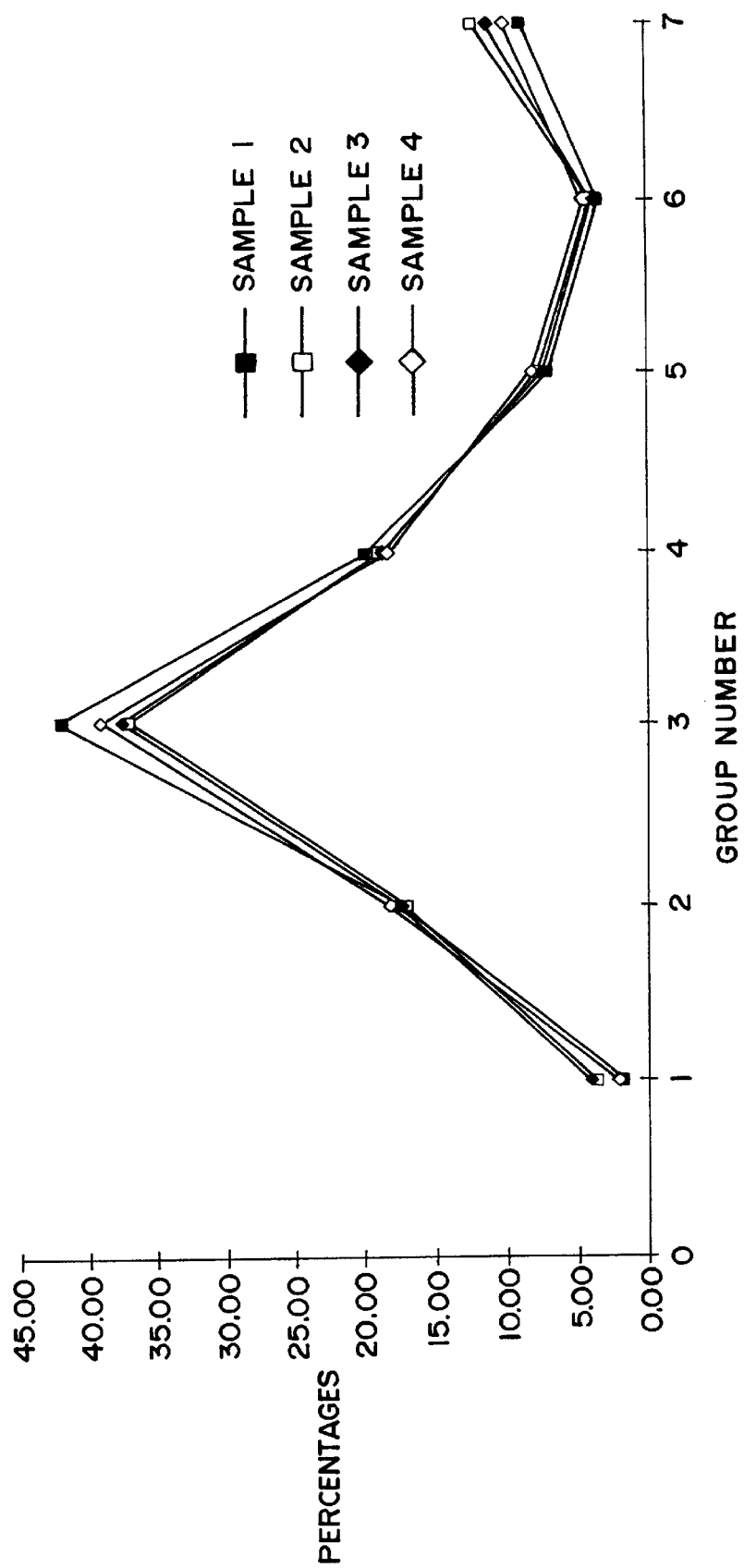
FIG. 3 is a graph showing the results of gas chromatography on a beeswax mimetic substance in accordance with an embodiment of the present invention.
Figure 4:
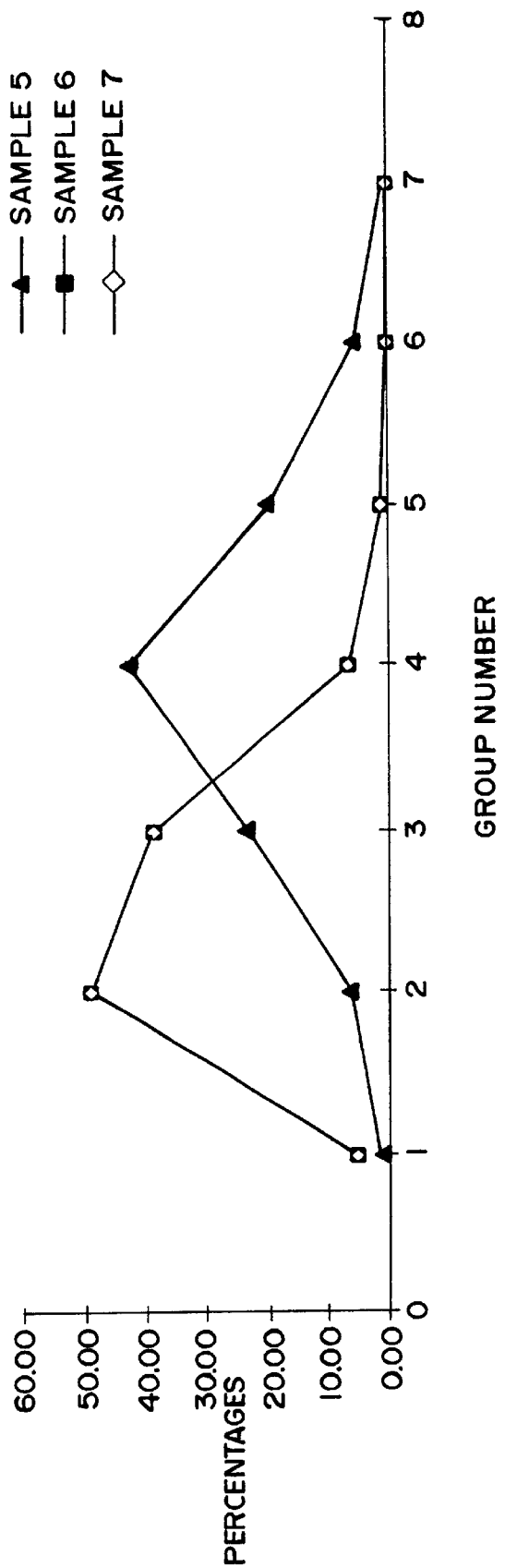
FIG. 4 shows the results of gas chromatography on two wax samples which were not very suitable as a beeswax mimetic substance.

In addition to the above experiments two further microcrystalline waxes were tested in identical foundations and in an identical way to the foundations according to the present invention as described above. Neither of these waxes performed well in the hives. The waxes were chosen so that their molecular weight distributions were a little lower and a little higher than that of Apicera™ wax. All the samples were analysed by high temperature capillary as chromatography. The equipment was first calibrated using a range of hydrocarbons of known carbon chain length. The output of the gas chromatograph is shown graphically in FIG. 2. It shows several discrete lines each one of which corresponds to one of the known hydrocarbons in the mixture. Then samples 1 to 7 were analysed in the same equipment. The results are summarised in Table 4 and shown graphically in FIG. 3 for samples 1 to 4 of mimetic substances in accordance with the present invention. Samples 1 to 4 were from different batches of Apicera™ wax all of which had performed well in the beehives and all of which are beeswax mimetic substances in accordance with the present invention. The results from samples 5 to 7 are given in Table 5 and shown graphically in FIG. 4.

TABLE 4

Gas chromatography results for samples 1 to 4

| Chain length group | carbon chain length range | sample 1 % | sample 2 % | sample 3 % | sample 4 % | Average | Stand. Deviation |
|---|---|---|---|---|---|---|---|
| 1 | C20–24 | 1.83 | 3.73 | 4.04 | 2.18 | 3 ± 1 | 1.1 |
| 2 | C25–29 | 17.34 | 16.97 | 17.38 | 18.19 | 17.5 ± 10 | 0.5 |
| 3 | C30–34 | 41.92 | 36.95 | 37.59 | 39.06 | 38.9 ± 15 | 2.2 |
| 4 | C35–39 | 19.7 | 18.74 | 18.66 | 18.22 | 18.8 ± 10 | 0.6 |
| 5 | C40–44 | 6.94 | 7.52 | 7.26 | 7.90 | 7.4 ± 4 | 0.4 |
| 6 | C45–49 | 3.49 | 3.92 | 3.84 | 4.41 | 3.9 ± 2 | 0.4 |
| 7 | >=C50 | 8.79 | 12.17 | 11.23 | 10.04 | 10.7 ± 5 | 1.43 |

Samples 5 and 6 were samples of microcrystalline wax with a slightly lower molecular weight and a slightly higher molecular distribution than Apicera™ wax, respectively. Both of these alternative waxes had performed very badly as foundations in the beehives. Sample 7 was an additional check sample to confirm the results from sample 6.

An output of the gas chromatograph for sample 2 is shown in FIG. 5. The outputs of all samples 1 to 4 were very similar to that shown in FIG. 5. It can been seen that the trace includes a series of well spaced peaks. Generally the difference between each peak relates to the difference in chain length of the hydrocarbon of one atom. By comparison with the calibration of FIG. 2, it can be seen that the a very large percentage (in fact it is over 98%) of the compounds of the microcrystalline wax have a chain length range equivalent to C20 to C55. From Table 4, and FIG. 3 it can be seen that the most common (=median) equivalent chain lengths for a suitable wax lie in a range 28 to 36 atoms. The median equivalent chain length for a suitable wax is preferably 33±4, more preferably 31±2 atoms. The mean equivalent chain length of a suitable wax is 33±4 more preferably 33±3 and most preferably 33±2 atoms. These values are specifically useful for beehives used in mid-European climates. The present invention includes modifications to these values, either up or down, for example, to accommodate different ambient temperature conditions, e.g. as may be experienced in the tropics or in countries closer to the poles, or as may be required to match the beeswax of other varieties of bees. The distribution of equivalent hydrocarbon chain lengths in the preferred microcrystalline wax in accordance with the present invention shows a generally symmetrical form about the mean with a high molecular weight tail above an equivalent length of C50. It is not anticipated that the minor quantities in the tail affect the performance of the wax but the present invention does not exclude such an effect. The molecular weight distribution of a wax which is a suitable for use as a beeswax mimetic substance in accordance with the present invention may be represented by a Poisson distribution or a combination of Poisson distributions. The distribution may also lie close to a Gaussian or a triangular distribution having a mean equivalent hydrocarbon chain length of between C30 and C38, or more preferably with a mean of between C30.5 and C36.5 in which the standard deviation of the distribution is between 3.5 and 6.5 carbon atoms.

TABLE 5

Gas chromatography results from wxes which were less successful in the beehive experiments

| Chain length group | carbon chain length range | sample 5 | sample 6 | sample 7 |
|---|---|---|---|---|
| 1 | C20–24 | 1.65 | 5.33 | 5.31 |
| 2 | C25–29 | 6.37 | 48.79 | 48.71 |
| 3 | C30–34 | 23.36 | 38.4 | 38.36 |
| 4 | C35–39 | 42.52 | 6.57 | 6.63 |
| 5 | C40–44 | 19.84 | 0.84 | 0.89 |
| 6 | C45–49 | 5.82 | 0.07 | 0.1 |
| 7 | >=C50 | 0.44 | | |

A notable aspect of the above results of samples 1 to 4 compared to samples 5 to 7 in the apparent specificity of the bees to a narrow molecular weight range of waxes suitable as beeswax mimetic substances. The differences between samples 5 to 7 and 1 to 4 are small. It is this specificity of the bees which has probably prevented the production of a suitable beeswax mimic up to now. However, once the teachings of the present invention have been understood, and in particular that a synthetic beeswax mimic is even possible, the skilled person may devise other chemical mixtures and compounds which may act as beeswax mimics. All these modifications are included within the scope of the present invention as they derive from the present invention.

Figure 6A:
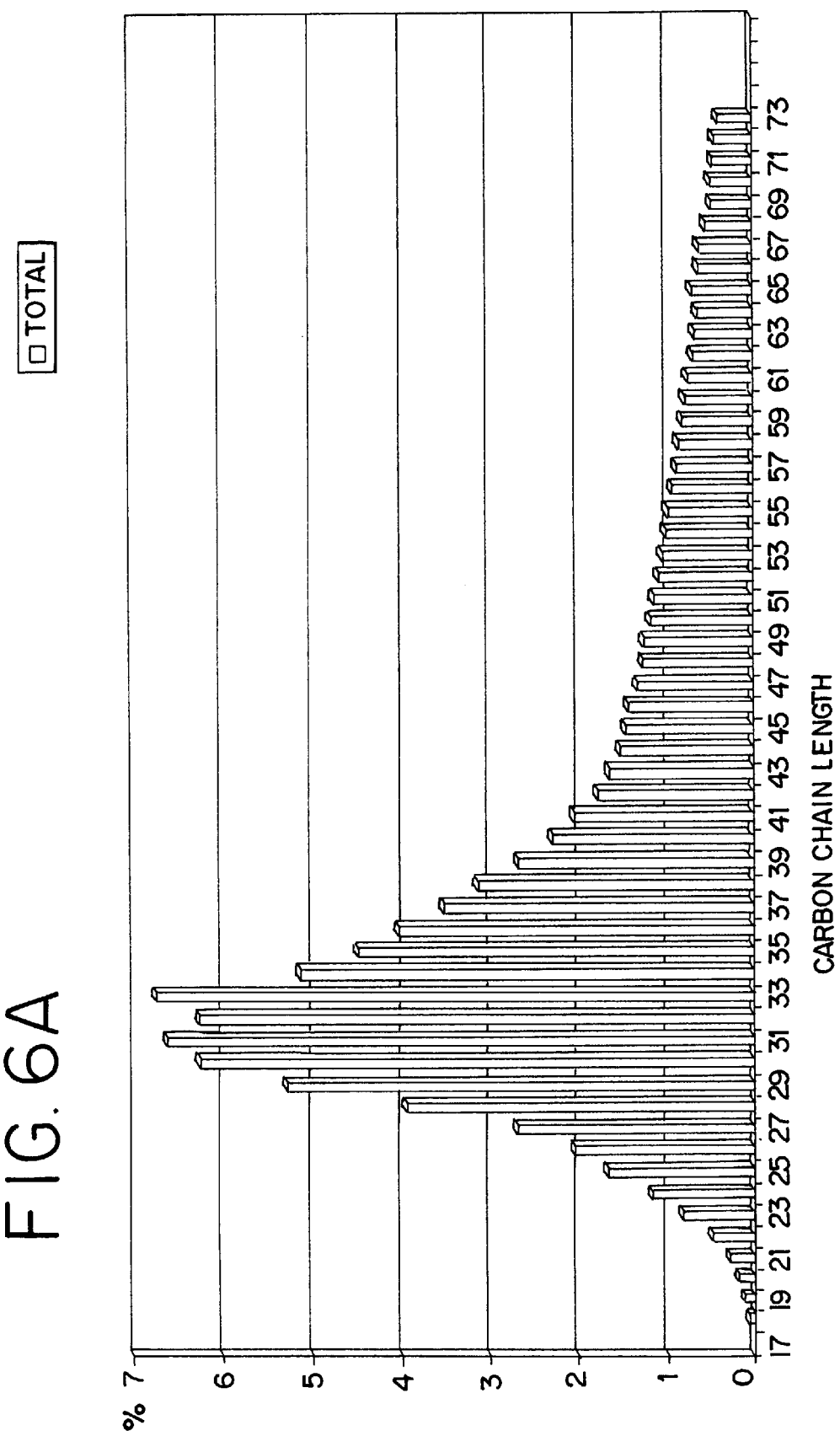
FIGS. 6A to C shows the results of gas chromatography on a beeswax mimetic substance in accordance with one embodiment of the present invention.
Figure 6B:
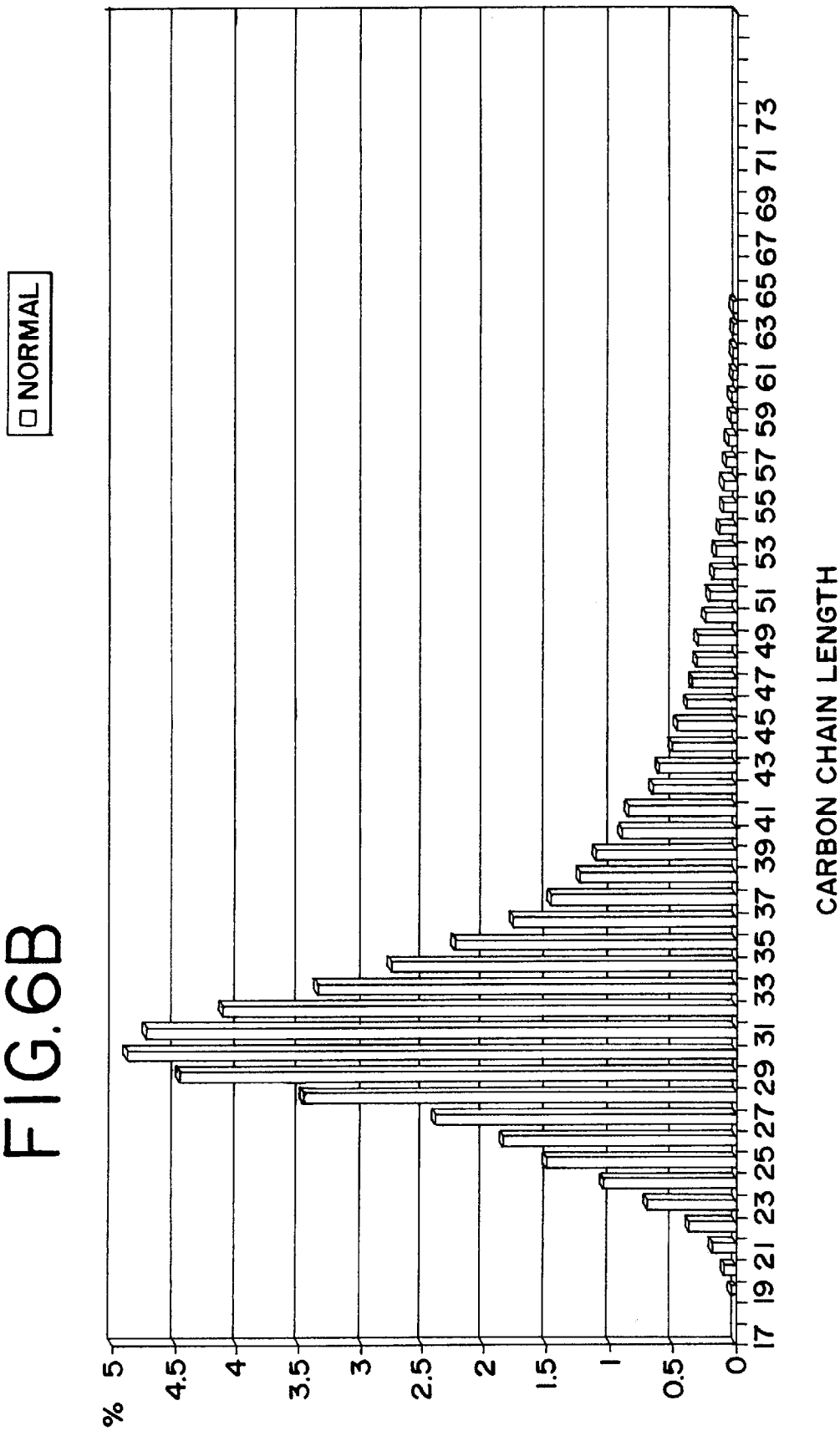
Figure 6C:
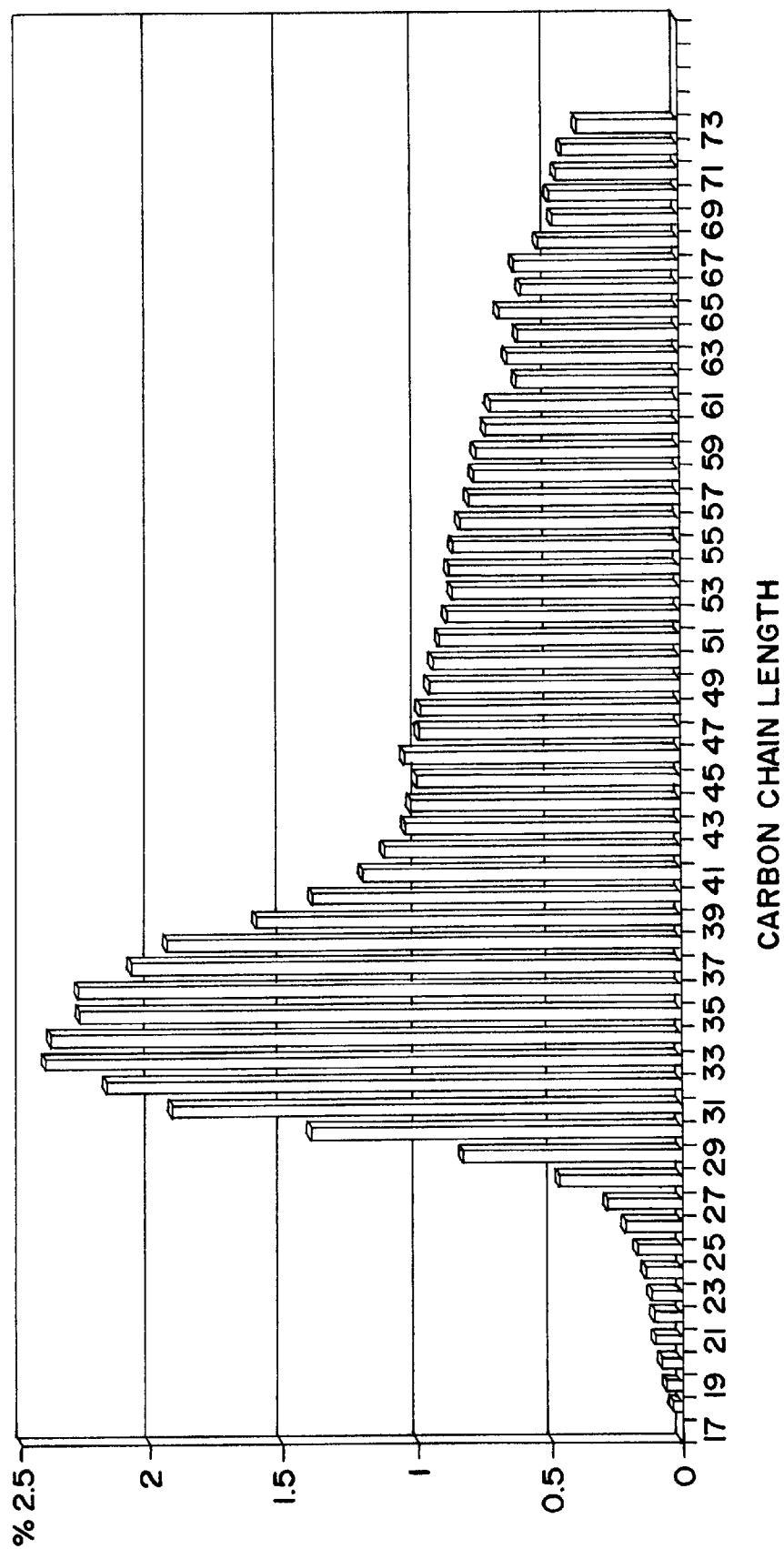

A more detailed analysis has been made of the beeswax mimetic substance Apicera™ using high temperature capillary gas chromatography. The purpose of these experiments is to identify the normal (unbranched) from the branched (iso-) forms of the homologous series of hydrocarbons which make up the microcrystaline wax Apicera™. It is assumed that because of the manufacturing process for microcrystalline wax as outlined above as one possible manufacturing method, the mixture of hydrocarbons includes substantially only unsaturated hydrocarbons. The results for the total hydrocarbon count, normal and iso-hydrocarbon forms are shown in FIGS. 6A–C. FIG. 6A shows the percentage of all hydrocarbons in the mixture against carbon chain length in a beeswax mimetic substance in accordance with the present invention. FIG. 6B shows the percentage for normal hydrocarbons against carbon chain length in this mixture. FIG. 6C shows the percentage of iso-hydrocarbons against carbon chain length in this mixture. Above a chain length of 74 atoms there may be a small proportion of undetected ios-hydrocarbons. It is noticeable that the iso-hydrocarbon distribution has a most common chain length (34 atoms) which is higher than the normal distribution (30 atoms). The average for the normal distribution is 29 carbon atoms, the average for the iso-form is 39 atoms and the average for the total distribution is 33 carbon atoms. All three percentage distributions approximate a Poisson distribution with $\lambda$ approximately equal to the average chain length of the respective distribution. The normal to iso- hydrocarbon ratio is about 60 to 40 in the mixture.

The present invention is not limited to the narrow molecular weight ranges described above. In accordance with the present invention beeswax mimics may be devised for other bee types or to work at different ambient temperatures. Hence, the present invention is not limited to the specific materials mentioned above but includes within its scope the concept of a synthetic beeswax mimic as such. From this concept it is expected that families of beeswax mimics may be formed once the requirement for a specific narrow molecular weight range wax to form a beeswax mimetic substance is understood.

What is claimed is:

1. Use of a synthetic or semi-synthetic beeswax mimetic substance in an apiculture accessory, the mimetic substance comprising a microcrystalline wax, said microcrystalline wax being characterised in that it has a mean carbon chain length of 33±4 atoms.

2. The use according to claim 1, wherein the beeswax mimetic substance is a food grade microcrystalline wax.

3. The use of claim 1, wherein said microcrystalline wax is characterised in that it has a mean carbon chain length of 33±3 atoms.

4. The use of claim 1, wherein said microcrystalline wax is characterised in that it has a mean carbon chain length of 33±2 atoms.

5. The use according to claim 1, wherein said microcrystalline wax comprises a mixture of compounds wherein over 98% of the compounds in the mixture have a chain length range between C20–C50.

6. The use according to claim 1, wherein said microcrystalline wax has a median equivalent chain length a range of 28 to 36 atoms.

7. An apiculture accessory for use in a beehive, the accessory comprising a semi-synthetic or synthetic beeswax mimetic substance, the mimetic substance comprising a microcrystalline wax, said microcrystalline wax being characterised in that it has a mean carbon chain length of 33±4 atoms.

8. The apiculture accessory according to claim 7, wherein the bees wax mimetic substance consists essentially of the microcrystalline wax.

9. The apiculture accessory according to claim 7, wherein a virgin surface of the accessory exposed to the bees consists essentially of the microcrystalline wax.

10. The apiculture accessory according to claim 7, wherein the microcrystalline wax is a food grade wax.

11. The apiculture accessory according to claim 7, wherein the accessory is one of artificial honeycombs, honeycomb foundations, beehive covers, beehive bottom boards, beehive queen excluders, beehive queen cages and beehive cell cups.

12. The apiculture accessory of characterised in that said microcrystalline wax has a mean carbon chain length of 33±3 atoms.

13. The apiculture accessory of claim 7, characterised in that said microcrystalline wax has a mean carbon chain length of 33±2 atoms.

14. The apiculture accessory of claim 7, wherein said microcrystalline wax comprises a mixture of compounds and over 98% of the compounds have a chain length range between C20–C50.

15. The apiculture accessory of claim 7, wherein said microcrystalline wax has a median equivalent chain length in a range of 28 to 36 atoms.

16. A method of reducing pests, disease or parasites in a beehive including at least one apiculture accessory comprising beeswax or a beeswax mimetic substance, the method comprising the step of: replacing the one apiculture accessory at periodic intervals with the same accessory made using virgin beeswax mimetic substance, the beeswax mimetic substance comprising a microcrystalline wax having a mean carbon chain length of 33±4 atoms.

17. The method according to claim 16, wherein the beeswax mimetic substance consists essentially of the microcrystalline wax.

18. The method of claim 16, characterised in that said microcrystalline wax has a mean carbon chain length of 33±3 atoms.

19. The method of claim 16, characterised in that said microcrystalline wax has a mean carbon chain length of 33±2 atoms.

20. The method of claim 16, wherein said microcrystalline wax comprises a mixture of compounds and over 98% of the compounds have a chain length range between C20–C50.

21. The method of claim 16, wherein said microcrystalline wax has a median equivalent chain length in a range of 28 to 36 atoms.

* * * * *